United States Patent
Luo et al.

(10) Patent No.: US 11,297,615 B2
(45) Date of Patent: Apr. 5, 2022

(54) WIRELESS COMMUNICATION METHOD AND DEVICE

(71) Applicants: SHARP KABUSHIKI KAISHA, Sakai (JP); FG INNOVATION COMPANY LIMITED, Tuen Mun (HK)

(72) Inventors: Chao Luo, Shanghai (CN); Renmao Liu, Shanghai (CN)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 95 days.

(21) Appl. No.: 16/649,814

(22) PCT Filed: Sep. 20, 2018

(86) PCT No.: PCT/CN2018/106735
§ 371 (c)(1),
(2) Date: Mar. 23, 2020

(87) PCT Pub. No.: WO2019/062640
PCT Pub. Date: Apr. 4, 2019

(65) Prior Publication Data
US 2020/0288464 A1    Sep. 10, 2020

(30) Foreign Application Priority Data
Sep. 29, 2017  (CN) .......................... 201710915127.X

(51) Int. Cl.
*H04W 72/04* (2009.01)
(52) U.S. Cl.
CPC ..... *H04W 72/0446* (2013.01); *H04W 72/042* (2013.01)

(58) Field of Classification Search
CPC ......................... H04W 72/0446; H04W 72/042
(Continued)

(56) References Cited

U.S. PATENT DOCUMENTS

| | | | |
|---|---|---|---|
| 10,631,174 B2 * | 4/2020 | You ...................... | H04J 11/0079 |
| 2018/0077690 A1 * | 3/2018 | Park ................... | H04W 72/042 |

(Continued)

FOREIGN PATENT DOCUMENTS

EP    3646656 A1    5/2020

OTHER PUBLICATIONS

Ericsson, Qualcomm:"New WID on Even further enhanced MTC for LTE", 3GPP TSG RAN Meeting #75, RP-170732, Dubrovnik, Croatia, Mar. 6-9, 2017.
(Continued)

*Primary Examiner* — Peter G Solinsky
(74) *Attorney, Agent, or Firm* — ScienBiziP, P.C.

(57) ABSTRACT

The present disclosure provides a method executed by user equipment, the method comprising: receiving downlink control information (DCI), the DCI comprising a repetition number; determining a number of subframes required to transmit a physical uplink shared channel (PUSCH) (N) according to the repetition number, a number of allocated resource units, and time occupied by each resource unit; and transmitting the PUSCH in the determined N subframes. The time occupied by each resource unit is expressed by: a number of uplink slots occupied by each resource unit, or a number of uplink subframes occupied by each resource unit. In addition, the present disclosure further provides corresponding user equipment and a base station.

4 Claims, 6 Drawing Sheets

(58) Field of Classification Search
USPC .......................................................... 370/336
See application file for complete search history.

(56) References Cited

U.S. PATENT DOCUMENTS

| 2019/0044646 | A1* | 2/2019 | Xu | H04L 27/36 |
| 2020/0187237 | A1* | 6/2020 | Su | H04W 4/70 |
| 2020/0221429 | A1* | 7/2020 | Li | H04L 5/0053 |
| 2021/0100023 | A1* | 4/2021 | Wei | H04W 72/14 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 14)", 3GPP TS 36.331 V14.4.0 (Sep. 2017).

"3rd Generation Partnership Project; Technical Specification Group Radio Access Network; Evolved Universal Terrestrial Radio Access (E-UTRA); Physical layer procedures(Release 14)", 3GPP TS 36.213 V14.4.0 (Sep. 2017).

"3rd Generation Partnership Project; Technical Specification Group Radio Access Network; Evolved Universal Terrestrial Radio Access (E-UTRA); Physical channels and modulation(Release 14)", 3GPP TS 36.211 V14.4.0 (Sep. 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 14)", 3GPP TS 36.300 V14.4.0 (Sep. 2017).

\* cited by examiner

US 11,297,615 B2

WIRELESS COMMUNICATION METHOD AND DEVICE

TECHNICAL FIELD

The present disclosure relates to the technical field of wireless communication, and specifically to a method executed by user equipment, a method executed by a base station, and corresponding user equipment and base station.

BACKGROUND

At the 3rd Generation Partnership Program (3GPP) RAN #75 plenary meeting held in March 2017, a new work item on even further enhancement of Machine Type Communication (MTC) (see non-patent literature: RP-170732: New WID on Even further enhanced MTC for LTE) was approved. One of the goals of the work item is to support resource allocation based on sub-physical resource blocks (sub-PRBs) (that is, support resource allocation based on less than one PRB) so as to improve the spectral efficiency of an MTC physical uplink shared channel.

In the existing 3GPP standard specifications on MTC, MTC UE in an RRC connected state supports two coverage enhancement modes: CE mode A and CE mode B. The coverage enhancement mode A is used for UE having good channel conditions, wherein no coverage enhancement or only small coverage enhancement is required; or in other words, no repeated transmission or only a lower number of repeated transmissions are required; the coverage enhancement mode B is used for UE having poor channel conditions, wherein a great or greater coverage enhancement is required; in other words, a greater number of repeated transmissions are required.

A base station (also referred to as an eNB) expands the coverage of a PUSCH by repetitions. Specifically, the eNB configures a maximum number of repetitions for PUSCH (pusch-maxNumRepetitionCEmodeB) through RRC signaling, and a corresponding set of repetitions for PUSCH is defined for each configurable maximum number of repetitions. For UEs in the coverage enhancement mode A, one set of repetitions for PUSCH contains four values, whereas for UEs in the coverage enhancement mode B, one set of repetitions for PUSCH contains eight values. The definition of the aforementioned sets is as shown in the following Table 8-2c of TS 36.213:

| Higher-layer Parameter 'pusch-maxNumRepetitionCEmodeB' | $\{n1, n2, \ldots, n8\}$ |
|---|---|
| Unconfigured | {4, 8, 16, 32, 64, 128, 256, 512} |
| 192 | {1, 4, 8, 16, 32, 64, 128, 192} |
| 256 | {4, 8, 16, 32, 64, 128, 192, 256} |
| 384 | {4, 16, 32, 64, 128, 192, 256, 384} |
| 512 | {4, 16, 64, 128, 192, 256, 384, 512} |
| 768 | {8, 32, 128, 192, 256, 384, 512, 768} |
| 1024 | {4, 8, 16, 64, 128, 256, 512, 1024} |
| 1536 | {4, 16, 64, 256, 512, 768, 1024, 1536} |
| 2048 | {4, 16, 64, 128, 256, 512, 1024, 2048} |

UE receives RRC signaling from the eNB so as to obtain the maximum number of repetitions for PUSCH (pusch-maxNumRepetitionCEmodeB), from which the set of repetitions for PUSCH can be known: $\{n_1, n_2, \ldots, n_{max}\}$ (For coverage enhancement mode B, the size of the set is 8, i.e., $n_{max}=n_8$), that is, a line in the table above.

The uplink data transmission of the UE is scheduled by the downlink control information (DCI) sent by the eNB. A 3-bit repetition number indication field in the DCI is used to indicate the number of repetitions for PUSCH adopted for the corresponding PUSCH transmission.

In the existing 3GPP standard specifications for MTC, the smallest resource allocation unit of PUSCH is one Physical Resource Block (PRB), i.e., a bandwidth occupying 12 subcarriers in the frequency domain. The subcarrier spacing in the existing LTE specifications is 15 kHz, and the physical bandwidth of one PRB is 180 kHz. When the UE has poor channel conditions, methods to achieve the desired reception quality for a PUSCH include increasing the transmit power of the UE or increasing the number of repetitions for PUSCH. However, the UE has a limit of the transmit power, or has a maximum transmit power. For a MTC UE having poor channel conditions or poor coverage, the legacy LTE system already uses the maximum power for transmission.

According to the research, for UEs with poor coverage, decreasing the bandwidth of resource allocation (e.g., the granularity of resource allocation is changed from 12 subcarriers to 6 subcarriers, or even 3 subcarriers or 1 subcarrier) and increasing the power per unit of frequency can effectively improve PUSCH link performance and improve uplink spectrum efficiency. This method is known as "sub-PRB" resource allocation.

After performing sub-PRB resource allocation, it is necessary to enhance the repetition number indication field in the DCI so as to support finer grained resource allocation.

SUMMARY

In order to solve the above problem, the present disclosure provides a method executed by user equipment, the method comprising: receiving downlink control information (DCI), the DCI comprising a repetition number; determining a number of subframes required to transmit a physical uplink shared channel (PUSCH) (N) according to the repetition number, a number of allocated resource units $N_{RU}$, and time occupied by each resource unit $N_t^{UL}$; and transmitting the PUSCH in the determined N subframes, wherein the time occupied by each resource unit $N_t^{UL}$ is expressed by: a number of uplink slots occupied by each resource unit $N_{slots}^{UL}$, or a number of uplink subframes occupied by each resource unit $N_{SF}^{UL}$.

In one embodiment, the number of subframes required N is determined according to the following: acquiring a maximum repetition number; acquiring a parameter set corresponding to the maximum repetition number; finding a corresponding parameter n from the parameter set based on the repetition number; and calculating the number of subframes required N based on the found parameter n, the number of allocated resource units $N_{RU}$ and the time occupied by each resource unit $N_t^{UL}$.

In one embodiment, the number of subframes required N is determined according to the following: finding a corresponding parameter n from the parameter set based on the repetition number; and calculating the number of subframes required N based on the found parameter n, the number of allocated resource units $N_{RU}$, and the time occupied by each resource unit $N_t^{UL}$.

In one embodiment, the step of calculating the number of subframes required N comprises: calculating the product of $N_{RU}$ and $N_{slots}^{UL}$ and dividing the product by 2 so as to obtain a first parameter; calculating the quotient of n divided by the first parameter and rounding up the quotient so as to obtain a second parameter; and multiplying the first parameter by the second parameter so as to obtain the number of subframes required N.

In one embodiment, the step of calculating the number of subframes required N comprises: calculating the product of $N_{RU}$ and $N_{SF}^{UL}$ so as to obtain a first parameter; calculating the quotient of n divided by the first parameter and rounding up the quotient so as to obtain a second parameter; and multiplying the first parameter by the second parameter so as to obtain the number of subframes required N.

In one embodiment, the step of calculating the number of subframes required N comprises: calculating the product of $N_{RU}$ and $N_{slots}^{UL}$ and dividing the product by 2 so as to obtain a first parameter; calculating the quotient of n divided by the first parameter and rounding up the quotient so as to obtain a second parameter; and multiplying the rounded-up value of the first parameter by the second parameter so as to obtain the number of subframes required N.

In one embodiment, the step of calculating the number of subframes required N comprises: calculating the product of $N_{RU}$ and $N_{slots}^{RU}$ and dividing the product by 2 so as to obtain a first parameter; calculating the quotient of n divided by the first parameter and rounding up the quotient so as to obtain a second parameter; and multiplying the rounded-down value of the first parameter by the second parameter so as to obtain the number of subframes required N.

In one embodiment, the step of calculating the number of subframes required N comprises: calculating the product of $N_{RU}$ and $N_{slots}^{UL}$ so as to obtain a first parameter; calculating the quotient of n divided by the first parameter and rounding up the quotient so as to obtain a second parameter; and multiplying the first parameter by the second parameter so as to obtain the number of subframes required N.

In one embodiment, the step of calculating the number of subframes required N comprises: calculating the product of $N_{RU}$ and $N_{slots}^{UL}$ and dividing the product by 2 so as to obtain a first parameter; and multiplying the first parameter by n so as to obtain the number of subframes required N.

In one embodiment, the step of calculating the number of subframes required N comprises: calculating the product of $N_{RU}$ and $N_{SF}^{UL}$ so as to obtain a first parameter; and multiplying the first parameter by n so as to obtain the number of subframes required N.

In one embodiment, the step of calculating the number of subframes required N comprises: calculating the product of $N_{RU}$ and $N_{slots}^{UL}$ and dividing the product by 2 so as to obtain a first parameter; and multiplying the rounded-up value of the first parameter by n so as to obtain the number of subframes required N.

In one embodiment, the step of calculating the number subframes required N comprises: calculating the product of $N_{RU}$ and $N_{slots}^{UL}$ and dividing the product by 2 so as to obtain a first parameter; and multiplying the rounded-down value of the first parameter by n so as to obtain the number of subframes required N.

According to another aspect of the present disclosure, a method executed by a base station is provided, the method comprising: transmitting DCI to user equipment, the DCI comprising a repetition number; and receiving a Physical Uplink Shared Channel (PUSCH) transmitted on a specific number N of subframes from the user equipment, wherein the specific number N is determined according to the repetition number, a number of allocated resource units $N_{RU}$ and time occupied by each resource unit $N_t^{UL}$. The time occupied by each resource unit $N_t^{UL}$ is expressed by: a number of uplink slots occupied by each resource unit $N_{slots}^{UL}$; or a number of uplink subframes occupied by each resource unit $N_{SF}^{UL}$.

According to another aspect of the present disclosure, user equipment is provided, comprising a processor and a memory. The memory stores instructions that, when run by the processor, cause the user equipment to execute the method executed by user equipment described above.

According to another aspect of the present disclosure, a base station is provided, comprising a processor and a memory. The memory stores instructions that, when run by the processor, cause the base station to execute the method executed by base station described above.

DESCRIPTION OF THE DRAWINGS

The above and other features of the present disclosure will become more apparent with the following detailed description in conjunction with the accompanying drawings.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Figure 1A:
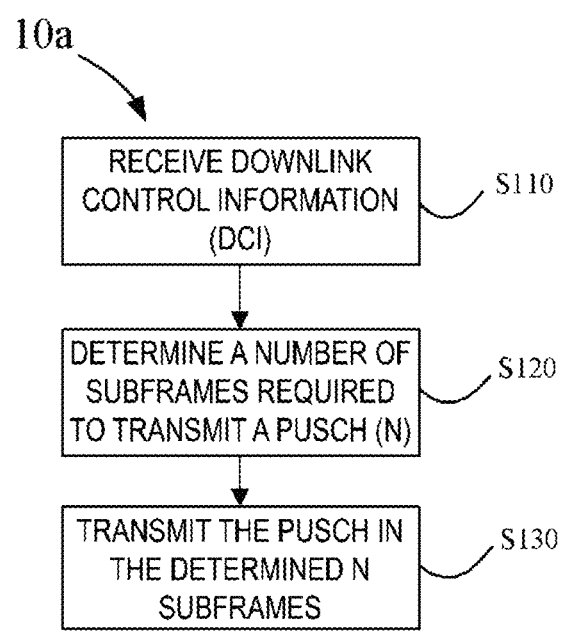
FIG. 1A is a flowchart of a method executed by the user equipment according to one embodiment of the present disclosure.

FIG. 1A illustrates a flowchart of a method 10a executed by the user equipment according to one embodiment of the present disclosure.

As illustrated in FIG. 1A, in step S110, DCI is received, wherein the DCI includes a repetition number. Alternatively, an indication of enabling a sub-PRB may be received from a base station through RRC signaling or DCI. If the indication of enabling the sub-PRB allocation mode is received from the base station through DCI, then the DCI may be the same DCI as the DCI including a repetition number.

In step S120, the number of subframes required to transmit a physical uplink shared channel PUSCH (N) is determined according to the repetition number, a number of allocated resource units $N_{RU}$ and time occupied by each resource unit $N_t^{UL}$. The number of allocated resource units $N_{RU}$ and the time occupied by each resource unit $N_t^{UL}$ may also be obtained through a DCI message.

In the present disclosure, the time occupied by each resource unit $N_t^{UL}$ is expressed by: the number of uplink slots occupied by each resource unit $N_{slots}^{UL}$, or the number of uplink subframes occupied by each resource unit $N_{SF}^{UL}$.

In the present disclosure, UE may transmit a PUSCH in subframe $n+k_i$, $i=0, 1, \ldots, N-1$, where the subframe n is the last subframe of a Machine-type communication Physical Downlink Control Channel (MPDCCH) used for scheduling a PUSCH; the subframe $n+k_0$ is the first subframe after the subframe $n+x$ that can be used to transmit a PUSCH, and $k_0 < k_1 < k_2 < \ldots < k_{N-1}$ is a value associated with N subframes that can be used by the UE to transmit a PUSCH, where x is a constant.

When the sub-PRB function is not enabled, $N \in \{n_1, n_2, \ldots, n_{max}\}$, the values of the 3-bit repetition number indication field in the DCI are: 0, 1, . . . , 7, which respectively indicate one value in $n_1, n_2, \ldots, n_{max}$, where $\{n_1, n_2, \ldots, n_{max}\}$ is a group of predefined values decided by a higher-layer parameter pusch-maxNumRepetitionCEmodeB. When the sub-PRB function is enabled, $N \in \{\bar{n}_1, \bar{n}_2, \ldots, \bar{n}_{max}\}$, the values of the 3-bit repetition number indication field in the DCI are: 0, 1, . . . , 7, which respectively indicate one value in $\bar{n}_1, \bar{n}_2, \ldots, \bar{n}_8$, wherein $\bar{n}_1, \bar{n}_2, \ldots, \bar{n}_{max}$ may adopt one of the following definitions:

$$\bar{n}_i = \left\lceil \frac{2 \cdot n_i}{N_{RU} \cdot N_{slots}^{UL}} \right\rceil \cdot \frac{N_{RU} \cdot N_{slots}^{UL}}{2}, i = 1, 2, \ldots, 8, \quad \text{Definition 1}$$

$$\bar{n}_i = \left\lceil \frac{2 \cdot n_i}{N_{RU} \cdot N_{slots}^{UL}} \right\rceil \cdot \left\lceil \frac{N_{RU} \cdot N_{slots}^{UL}}{2} \right\rceil, i = 1, 2, \ldots, 8, \quad \text{Definition 2}$$

$$\bar{n}_i = \left\lceil \frac{2 \cdot n_i}{N_{RU} \cdot N_{slots}^{UL}} \right\rceil \cdot \left\lfloor \frac{N_{RU} \cdot N_{slots}^{UL}}{2} \right\rfloor, i = 1, 2, \ldots, 8, \quad \text{Definition 3}$$

$$\bar{n}_i = \left\lceil \frac{n_i}{N_{RU} \cdot N_{slots}^{UL}} \right\rceil \cdot N_{RU} \cdot N_{slots}^{UL}, i = 1, 2, \ldots, 8, \quad \text{Definition 4}$$

$$\bar{n}_i = \left\lceil \frac{n_i}{N_{RU} \cdot N_{slots}^{UL}} \right\rceil \cdot N_{RU} \cdot N_{SF}^{UL}, i = 1, 2, \ldots, 8, \quad \text{Definition 5}$$

$$\bar{n}_i = \bar{\bar{n}}_i \cdot \frac{N_{RU} \cdot N_{slots}^{UL}}{2}, i = 1, 2, \ldots, 8, \quad \text{Definition 6}$$

where the values of $\{\bar{\bar{n}}_1, \bar{\bar{n}}_2, \ldots, \bar{\bar{n}}_8\}$ may adopt one of the following definitions:

1. $\bar{\bar{n}}_1=1, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
2. $\bar{\bar{n}}_1=1, \bar{\bar{n}}_2=2, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
3. $\bar{\bar{n}}_1=2, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
4. $\bar{\bar{n}}_1=1, \bar{\bar{n}}_2=2, \bar{\bar{n}}_3=4, \bar{\bar{n}}_4=16, \bar{\bar{n}}_5=32, \bar{\bar{n}}_6=64, \bar{\bar{n}}_7=128, \bar{\bar{n}}_8=256$,
5. $\bar{\bar{n}}_1=1, \bar{\bar{n}}_2=2, \bar{\bar{n}}_3=4, \bar{\bar{n}}_4=8, \bar{\bar{n}}_5=32, \bar{\bar{n}}_6=64, \bar{\bar{n}}_7=128, \bar{\bar{n}}_8=256$,
6. $\bar{\bar{n}}_1=1, \bar{\bar{n}}_2=2, \bar{\bar{n}}_3=4, \bar{\bar{n}}_4=8, \bar{\bar{n}}_5=16, \bar{\bar{n}}_6=32, \bar{\bar{n}}_7=64, \bar{\bar{n}}_8=128$,
7. $\{\bar{\bar{n}}_1, \bar{\bar{n}}_2, \ldots, \bar{\bar{n}}_8\}$ is a group of predefined values decided by a higher-layer parameter, such as pusch-maxNumRepetitionCEmodeB. For example, one of the following tables may be adopted:

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
| --- | --- |
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {2, 8, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
| --- | --- |
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {1, 4, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
| --- | --- |
| Unconfigured | {1, 2, 8, 16, 32, 64, 128, 256} |
| 192 | {1, 2, 8, 16, 32, 48, 64, 96} |
| 256 | {1, 2, 8, 16, 32, 64, 96, 128} |
| 384 | {1, 2, 8, 16, 32, 64, 128, 192} |
| 512 | {1, 2, 8, 16, 32, 64, 128, 256} |
| 768 | {1, 4, 16, 32, 64, 128, 256, 384} |
| 1024 | {1, 2, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
| --- | --- |
| Unconfigured | {2, 4, 8, 16, 32, 64, 128, 256} |
| 192 | {1, 2, 8, 16, 32, 48, 64, 96} |
| 256 | {2, 4, 8, 16, 32, 64, 96, 128} |
| 384 | {2, 4, 8, 16, 32, 64, 128, 192} |
| 512 | {2, 4, 8, 16, 32, 64, 128, 256} |
| 768 | {2, 8, 16, 32, 64, 128, 256, 384} |
| 1024 | {2, 4, 8, 16, 64, 128, 256, 512} |
| 1536 | {2, 8, 32, 64, 128, 256, 512, 768} |
| 2048 | {2, 8, 16, 64, 128, 256, 512, 1024} |

$$\bar{n}_i = \bar{\bar{n}}_i \cdot \left\lceil \frac{N_{RU} \cdot N_{slots}^{UL}}{2} \right\rceil, i = 1, 2, \ldots, 8, \quad \text{Definition 7}$$

where the values of $\{\bar{\bar{n}}_1, \bar{\bar{n}}_2, \ldots, \bar{\bar{n}}_8\}$ may adopt one of the following definitions:

1. $\bar{\bar{n}}_1=1, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
2. $\bar{\bar{n}}_1=1, \bar{\bar{n}}_2=2, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
3. $\bar{\bar{n}}_1=2, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
4. $\bar{\bar{n}}_1=1, \bar{\bar{n}}_2=2, \bar{\bar{n}}_3=4, \bar{\bar{n}}_4=16, \bar{\bar{n}}_5=32, \bar{\bar{n}}_6=64, \bar{\bar{n}}_7=128, \bar{\bar{n}}_8=256$,
5. $\bar{\bar{n}}_1=1, \bar{\bar{n}}_2=2, \bar{\bar{n}}_3=4, \bar{\bar{n}}_4=8, \bar{\bar{n}}_5=32, \bar{\bar{n}}_6=64, \bar{\bar{n}}_7=128, \bar{\bar{n}}_8=256$,
6. $\bar{\bar{n}}_1=1, \bar{\bar{n}}_2=2, \bar{\bar{n}}_3=4, \bar{\bar{n}}_4=8, \bar{\bar{n}}_5=16, \bar{\bar{n}}_6=32, \bar{\bar{n}}_7=64, \bar{\bar{n}}_8=128$,
7. $\{\bar{\bar{n}}_1, \bar{\bar{n}}_2, \ldots, \bar{\bar{n}}_8\}$ is a group of predefined values decided by a higher-layer parameter, such as pusch-maxNumRepetitionCEmodeB. For example, one of the following tables may be adopted:

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {2, 8, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or,

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {1, 4, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or,

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {1, 2, 8, 16, 32, 64, 128, 256} |
| 192 | {1, 2, 8, 16, 32, 48, 64, 96} |
| 256 | {1, 2, 8, 16, 32, 64, 96, 128} |
| 384 | {1, 2, 8, 16, 32, 64, 128, 192} |
| 512 | {1, 2, 8, 16, 32, 64, 128, 256} |
| 768 | {1, 4, 16, 32, 64, 128, 256, 384} |
| 1024 | {1, 2, 8, 16, 64, 128, 256, 512} |
| 1536 | {1, 8, 32, 64, 128, 256, 512, 768} |
| 2048 | {1, 4, 16, 64, 128, 256, 512, 1024} | or,

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {2, 4, 8, 16, 32, 64, 128, 256} |
| 192 | {1, 2, 8, 16, 32, 48, 64, 96} |
| 256 | {2, 4, 8, 16, 32, 64, 96, 128} |
| 384 | {2, 4, 8, 16, 32, 64, 128, 192} |
| 512 | {2, 4, 8, 16, 32, 64, 128, 256} |
| 768 | {2, 8, 16, 32, 64, 128, 256, 384} |
| 1024 | {2, 4, 8, 16, 64, 128, 256, 512} |
| 1536 | {2, 8, 32, 64, 128, 256, 512, 768} |
| 2048 | {2, 8, 16, 64, 128, 256, 512, 1024} |

$$\bar{n}_i = \bar{\bar{n}}_i \cdot \left\lfloor \frac{N_{RU} \cdot N_{slots}^{UL}}{2} \right\rfloor, i = 1, 2, \ldots, 8, \quad \text{Definition 8}$$

where the values of $\{\bar{\bar{n}}_1, \bar{\bar{n}}_2, \ldots, \bar{\bar{n}}_8\}$ may adopt one of the following definitions:

1. $\bar{\bar{n}}_1=1, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
2. $\bar{\bar{n}}_1=1, \bar{\bar{n}}_2=2, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
3. $\bar{\bar{n}}_1=2, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$,
4. $\bar{\bar{n}}_1=1, \bar{\bar{n}}_2=2, \bar{\bar{n}}_3=4, \bar{\bar{n}}_4=16, \bar{\bar{n}}_5=32, \bar{\bar{n}}_6=64, \bar{\bar{n}}_7=128, \bar{\bar{n}}_8=256$,
5. $\bar{\bar{n}}_1=1, \bar{\bar{n}}_2=2, \bar{\bar{n}}_3=4, \bar{\bar{n}}_4=8, \bar{\bar{n}}_5=32, \bar{\bar{n}}_6=64, \bar{\bar{n}}_7=128, \bar{\bar{n}}_8=256$,
6. $\bar{\bar{n}}_1=1, \bar{\bar{n}}_2=2, \bar{\bar{n}}_3=4, \bar{\bar{n}}_4=8, \bar{\bar{n}}_5=16, \bar{\bar{n}}_6=32, \bar{\bar{n}}_7=64, \bar{\bar{n}}_8=128$,
7. $\{\bar{\bar{n}}_1, \bar{\bar{n}}_2, \ldots, \bar{\bar{n}}_8\}$ is a group of predefined values decided by a higher-layer parameter, such as pusch-maxNumRepetitionCEmodeB. For example, one of the following tables may be adopted:

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {2, 8, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {1, 4, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or,

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {1, 2, 8, 16, 32, 64, 128, 256} |
| 192 | {1, 2, 8, 16, 32, 48, 64, 96} |
| 256 | {1, 2, 8, 16, 32, 64, 96, 128} |
| 384 | {1, 2, 8, 16, 32, 64, 128, 192} |
| 512 | {1, 2, 8, 16, 32, 64, 128, 256} |
| 768 | {1, 4, 16, 32, 64, 128, 256, 384} |
| 1024 | {1, 2, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{\bar{n}}_1, \bar{\bar{n}}_2, \ldots, \bar{\bar{n}}_8\}$ |
|---|---|
| Unconfigured | {2, 4, 8, 16, 32, 64, 128, 256} |
| 192 | {1, 2, 8, 16, 32, 48, 64, 96} |
| 256 | {2, 4, 8, 16, 32, 64, 96, 128} |
| 384 | {2, 4, 8, 16, 32, 64, 128, 192} |
| 512 | {2, 4, 8, 16, 32, 64, 128, 256} |
| 768 | {2, 8, 16, 32, 64, 128, 256, 384} |
| 1024 | {2, 4, 8, 16, 64, 128, 256, 512} |
| 1536 | {2, 8, 32, 64, 128, 256, 512, 768} |
| 2048 | {2, 8, 16, 64, 128, 256, 512, 1024} |

Definition 9: $\bar{n}_i = \bar{\bar{n}}_i \cdot N_{RU} \cdot N_{SF}^{UL}$, $i=1, 2, \ldots, 8$, where the values of $\{\bar{\bar{n}}_1, \bar{\bar{n}}_2, \ldots, \bar{\bar{n}}_8\}$ may adopt one of the following definitions:

1. $\bar{\bar{n}}_1=1, \bar{\bar{n}}_2=4, \bar{\bar{n}}_3=8, \bar{\bar{n}}_4=16, \bar{\bar{n}}_5=32, \bar{\bar{n}}_6=64, \bar{\bar{n}}_7=128, \bar{\bar{n}}_8=256$, 2. $\bar{n}_1=1$, $\bar{n}_2=2$, $\bar{n}_3=8$, $\bar{n}_4=16$, $\bar{n}_5=32$, $\bar{n}_6=64$, $\bar{n}_7=128$, $\bar{n}_8=256$, 3. $\bar{n}_1=2$, $\bar{n}_2=4$, $\bar{n}_3=8$, $\bar{n}_4=16$, $\bar{n}_5=32$, $\bar{n}_6=64$, $\bar{n}_7=128$, $\bar{n}_8=256$, 4. $\bar{n}_1=1$, $\bar{n}_2=2$, $\bar{n}_3=4$, $\bar{n}_4=16$, $\bar{n}_5=32$, $\bar{n}_6=64$, $\bar{n}_7=128$, $\bar{n}_8=256$, 5. $\bar{n}_1=1$, $\bar{n}_2=2$, $\bar{n}_3=4$, $\bar{n}_4=8$, $\bar{n}_5=32$, $\bar{n}_6=64$, $\bar{n}_7=128$, $\bar{n}_8=256$, 6. $\bar{n}_1=1$, $\bar{n}_2=2$, $\bar{n}_3=4$, $\bar{n}_4=8$, $\bar{n}_5=16$, $\bar{n}_6=32$, $\bar{n}_7=64$, $\bar{n}_8=128$, 7. $\{\bar{n}_1, \bar{n}_2, \ldots, \bar{n}_8\}$ is a group of predefined values decided by a higher-layer parameter, such as pusch-maxNumRepetitionCEmodeB. For example, one of the following tables may be adopted:

| Higher-layer Parameter 'pusch-maxNumRepetitionCEmodeB' | $\{\bar{n}_1, \bar{n}_2, \ldots, \bar{n}_8\}$ |
|---|---|
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {2, 8, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{n}_1, \bar{n}_2, \ldots, \bar{n}_8\}$ |
|---|---|
| Unconfigured | {1, 4, 8, 16, 32, 64, 128, 256} |
| 192 | {1, 4, 8, 16, 32, 48, 64, 96} |
| 256 | {1, 4, 8, 16, 32, 64, 96, 128} |
| 384 | {1, 4, 8, 16, 32, 64, 128, 192} |
| 512 | {1, 4, 8, 16, 32, 64, 128, 256} |
| 768 | {1, 4, 16, 32, 64, 128, 256, 384} |
| 1024 | {1, 4, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{n}_1, \bar{n}_2, \ldots, \bar{n}_8\}$ |
|---|---|
| Unconfigured | {1, 2, 8, 16, 32, 64, 128, 256} |
| 192 | {1, 2, 8, 16, 32, 48, 64, 96} |
| 256 | {1, 2, 8, 16, 32, 64, 96, 128} |
| 384 | {1, 2, 8, 16, 32, 64, 128, 192} |
| 512 | {1, 2, 8, 16, 32, 64, 128, 256} |
| 768 | {1, 4, 16, 32, 64, 128, 256, 384} |
| 1024 | {1, 2, 8, 16, 64, 128, 256, 512} |
| 1536 | {1, 8, 32, 64, 128, 256, 512, 768} |
| 2048 | {1, 4, 16, 64, 128, 256, 512, 1024} | or

| Higher-layer Parameter 'pusch-maxNumRepetitionCEmodeB' | $\{\bar{n}_1, \bar{n}_2, \ldots, \bar{n}_8\}$ |
|---|---|
| Unconfigured | {2, 4, 8, 16, 32, 64, 128, 256} |
| 192 | {1, 2, 8, 16, 32, 48, 64, 96} |
| 256 | {2, 4, 8, 16, 32, 64, 96, 128} |
| 384 | {2, 4, 8, 16, 32, 64, 128, 192} |
| 512 | {2, 4, 8, 16, 32, 64, 128, 256} |
| 768 | {2, 8, 16, 32, 64, 128, 256, 384} |
| 1024 | {2, 4, 8, 16, 64, 128, 256, 512} |
| 1536 | {2, 8, 32, 64, 128, 256, 512, 768} |
| 2048 | {2, 8, 16, 64, 128, 256, 512, 1024} |

In all the aforementioned definitions, $N_{RU}$ represents the number of resource units allocated in the DCI; $N_{slots}^{UL}$ represents the number of slots allocated in time domain (there are two consecutive slots in each subframe); and $N_{SF}^{UL}$ represents the number of subframes occupied by the allocated RU type time domain. RU is defined as $N_{slots}^{UL}$ consecutive slots in the time domain and $N_{SC}^{RU}$ consecutive subcarriers in the frequency domain. For example, the possible combinations of $N_{SC}^{RU}$ and $N_{slots}^{UL}$ are as follows:

| $N_{sc}^{RU}$ | $N_{slots}^{UL}$ |
|---|---|
| 1 | 16 |
| 3 | 8 |
| 6 | 4 |
| 12 | 2 |

Or, RU is defined as $N_{SF}^{UL}$ consecutive subframes in the time domain and $N_{SC}^{RU}$ consecutive subcarriers in the frequency domain. For example, the possible combinations of $N_{SC}^{RU}$ and $N_{SF}^{UL}$ are as follows:

| $N_{sc}^{RU}$ | $N_{SF}^{UL}$ |
|---|---|
| 1 | 8 |
| 3 | 4 |
| 6 | 2 |
| 12 | 1 |

A possible implementation of resource allocation based on a PRB and resource allocation based on a sub-PRB is compared with reference to FIG. 3 and FIG. 4 below.

Figure 3:
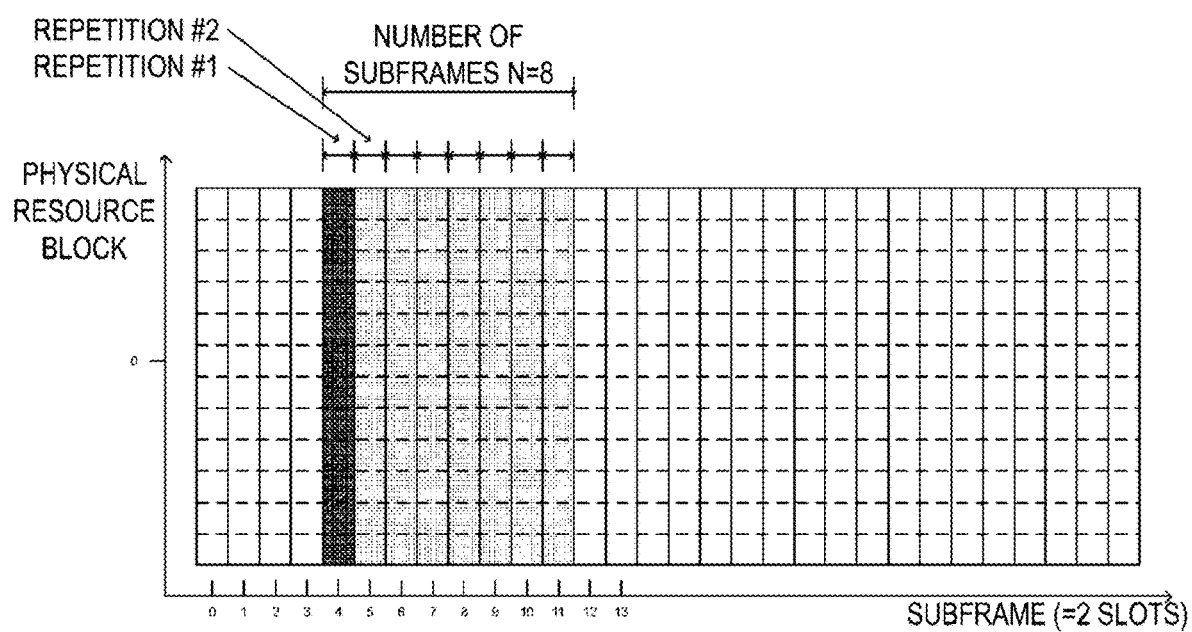
FIG. 3 is a schematic diagram of a resource allocation method based on PRB.

FIG. 3 is a schematic diagram of a resource allocation method based on a PRB. As illustrated in FIG. 3, the granularity of resource allocation is one PRB (comprising 12 subcarriers, with a duration of 1 subframe, i.e., 2 slots). The base station may inform the UE of the following information in the DCI:

Frequency domain dimension: one PRB is allocated starting from PRB 0.

Time domain dimension: one subframe starting from subframe 4. In this case, the time is always one subframe.

Repetition number: the allocated time-frequency resources, i.e., the contents transmitted on the subframe starting from subframe 4, are repeated eight times in the time domain (in order to facilitate identification, in the drawings different colors are used for repetition #1 and other repetitions). Obviously, 8 subframes (N=8) in total are thus occupied. In the DCI, a special 3-bit field is used to describe the repetition number. In this example, the value indicated by this field in the DCI may be considered as a "subframe".

Figure 4:
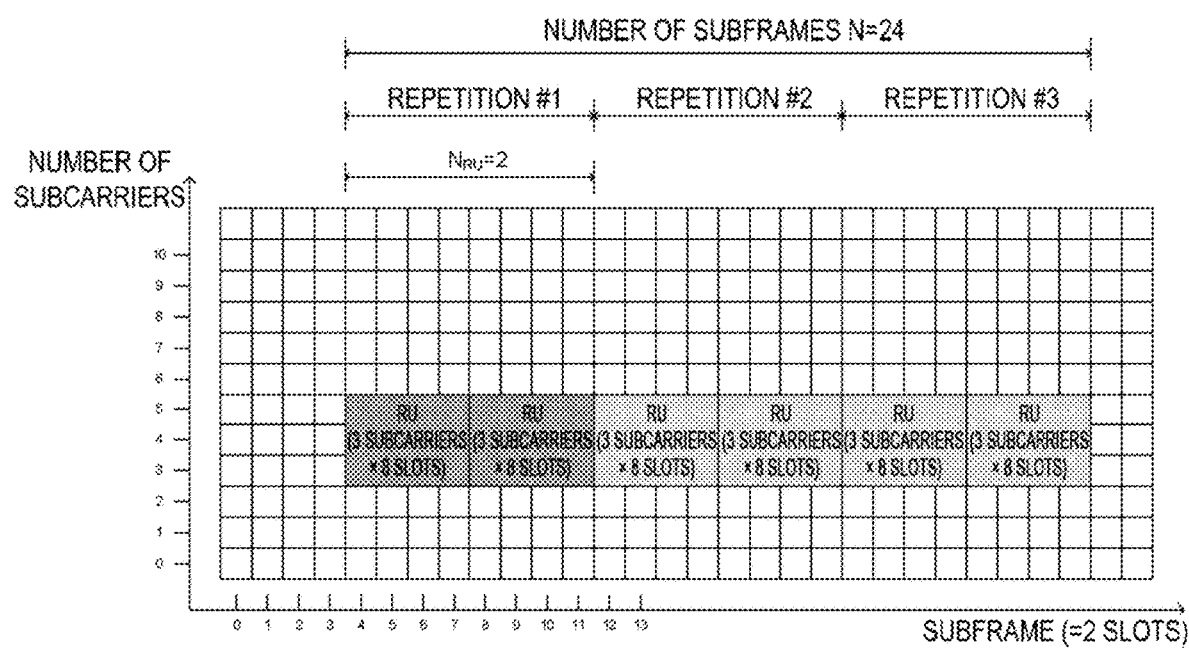
FIG. 4 is a schematic diagram of a resource allocation method based on sub-PRB.

FIG. 4 is a schematic diagram of a resource allocation method based on sub-PRB. In the resource allocation illustrated in FIG. 4, the base station may inform the UE of the following information in the DCI:

Frequency domain dimension: three subcarriers allocated from subcarrier 3. That is, the RU definition with three subcarrier width is used, and since only one such definition (3 subcarriers×8 slots) exists, at the same time, the "type" of RU is also implied here.

Time domain dimension: two RUs allocated starting from subframe 4. It can also be seen from this that $N_{RU}$ is totally independent from $N_{SC}^{RU}$ and $N_{slots}^{UL}$ mentioned above: the latter refers to how to define RU, while the former refers to how many RUs in total are to be allocated to the UE.

Repetition number: repeat the allocated time-frequency resources, i.e., two RUs starting from subframe 4, for three times in the time domain. It can be calculated that 24 subframes (N=24) in total will be occupied. As mentioned above, a special 3-bit field in the DCI is used to describe the repetition number.

As mentioned above, for resource allocation based on a PRB, a subframe is used as a unit. In the present disclosure, new rules for calculating N are defined such that the calculation of N is decoupled from the RU definition.

Please refer to FIG. 1A again. In the step S130, the PUSCH is transmitted in the determined N subframes. That is, the PUSCH is transmitted in subframe $n+k_i$, $i=0, 1, \ldots, N-1$.

Figure 1B:
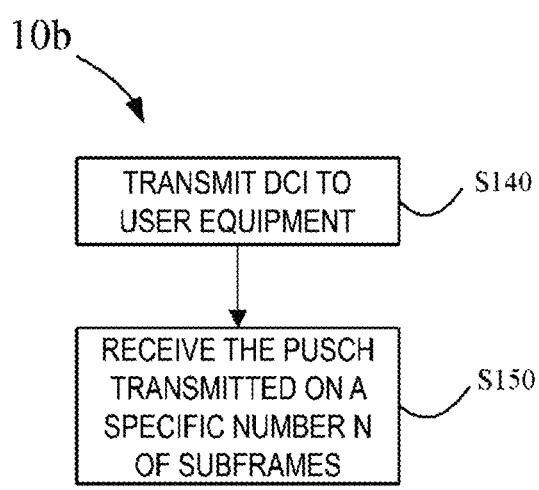
FIG. 1B is a flowchart of a method executed by a base station according to one embodiment of the present disclosure.

FIG. 1B is a flowchart of a method executed by a base station according to one embodiment of the present disclosure.

As illustrated in FIG. 1B, in step S140, DCI is transmitted to the user equipment, the DCI including a repetition number.

In step S150, a Physical Uplink Shared Channel (PUSCH) transmitted from the user equipment on a specific number N of subframes is received. As described above, the specific number N is determined according to the repetition number, the number of allocated resource units $N_{RU}$, and the time occupied by each resource unit $N_t^{UL}$. The time occupied by each resource unit $N_t^{UL}$ is expressed by: the number of uplink slots occupied by each resource unit $N_{slots}^{UL}$; or the number of uplink subframes occupied by each resource unit $N_{SF}^{UL}$.

Figure 2A:
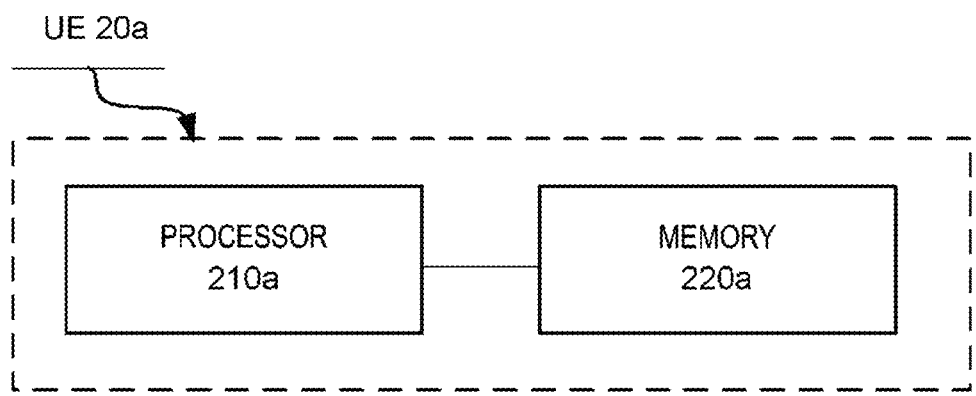
FIG. 2A is a block diagram of the user equipment according to one embodiment of the present disclosure.

FIG. 2A is a block diagram of the user equipment 20a according to one embodiment of the present disclosure. As illustrated in FIG. 2A, the user equipment 20a includes a processor 210a and a memory 220a. The processor 210a may, for example, include a microprocessor, a microcontroller, an embedded processor, or the like. The memory 220a may, for example, include a volatile memory (for example, a random access memory (RAM)), a hard disk drive (HDD), a non-volatile memory (for example, a flash memory), or other memories. The memory 220a stores program instructions. The instructions, when run by the processor 210a, can execute the aforementioned method executed by the user equipment (for example, the method illustrated in FIG. 1A) described in detail in the present disclosure.

Figure 2B:
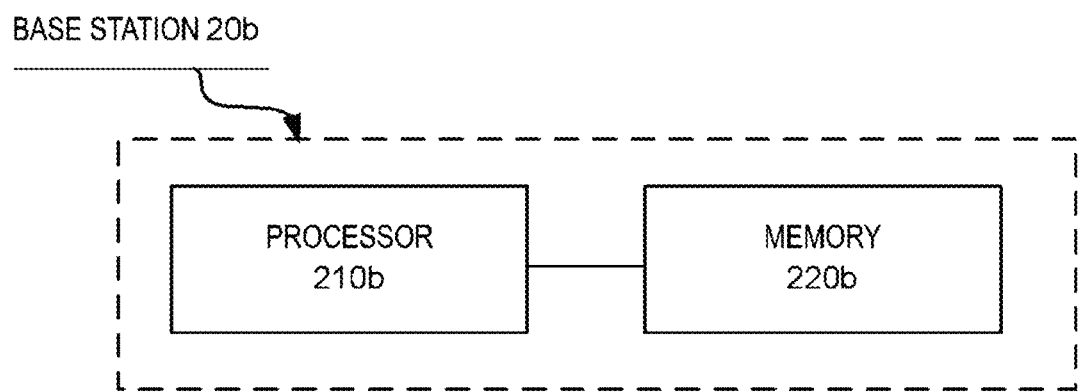
FIG. 2B is a block diagram of a base station according to one embodiment of the present disclosure.

FIG. 2B is a block diagram of a base station 20b according to one embodiment of the present disclosure. As illustrated in FIG. 2B, the base station 20b includes a processor 210b and a memory 220b. The processor 210b may, for example, comprise a microprocessor, a microcontroller, an embedded processor, or the like. The memory 220b may, for example, comprise a volatile memory (for example, a random access memory (RAM)), a hard disk drive (HDD), a non-volatile memory (for example, a flash memory), or other memories. The memory 220b stores program instructions; the instructions, when run by the processor 210b, can execute the aforementioned method executed by a base station (for example, the method illustrated in FIG. 1B) described in detail in the present disclosure.

The program running on the device according to the present disclosure may be a program that enables a computer to implement the functions of the embodiments of the present disclosure by controlling a Central Processing Unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-piece integrated circuits). Circuits designed to execute the functions described in the present specification may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method executed by a user equipment, the method comprising:
receiving radio resource control (RRC) signaling and downlink control information (DCI), the RRC signaling comprising a maximum physical uplink shared channel (PUSCH) repetition value, and the DCI comprising a repetition number indication field;

determining a set of PUSCH repetition values corresponding to the maximum PUSCH repetition value;
selecting a first parameter from the determined set of PUSCH repetition values based on the repetition number indication field;
determining a total number of subframes required to transmit a PUSCH according to the first parameter, a total number of allocated resource units, and time occupied by each of the allocated resource units; and
transmitting the PUSCH in N subframes, N being the determined total number of subframes, wherein:
the N is equal to the first parameter when an indication of sub-physical resource block (PRB) resource allocation is not received via one of the RRC signaling and the DCI,
the N is equal to a value calculated by multiplying a second parameter by a third parameter when the indication of sub-PRB resource allocation is received via one of the RRC signaling and the DCI,
the second parameter is a product of the total number of allocated resource units and a total number of uplink slots occupied by each of the allocated resource units divided by 2, and
the third parameter is a nearest integer equal to or larger than a quotient of the first parameter divided by the second parameter.

2. A method executed by a base station, the method comprising:
transmitting radio resource control (RRC) signaling and downlink control information (DCI) to a user equipment, the RRC signaling comprising a maximum physical uplink shared channel (PUSCH) repetition value, and the DCI comprising a repetition number indication field; and
receiving a PUSCH in N subframes from the user equipment, N being a total number of subframes, wherein:
a first parameter is selected, based on the repetition number indication field, from a set of PUSCH repetition values corresponding to the maximum PUSCH repetition value;
the N is determined according to the first parameter, a total number of allocated resource units, and time occupied by each of the allocated resource units,
the N is equal to the first parameter when the base station does not transmit an indication of sub-physical resource block (PRB) resource allocation via one of the RRC signaling and the DCI,
the N is equal to a value calculated by multiplying a second parameter by a third parameter when the base station transmits the indication of sub-PRB resource allocation via one of the RRC signaling and the DCI,
the second parameter is a product of the total number of allocated resource units and a total number of uplink slots occupied by each of the allocated resource units divided by 2, and
the third parameter is a nearest integer equal to or larger than a quotient of the first parameter divided by the second parameter.

3. A user equipment, comprising:
a processor; and
a memory, the memory storing instructions, wherein
the instructions, when executed by the processor, cause the user equipment to:
receive radio resource control (RRC) signaling and downlink control information (DCI), the RRC signaling comprising a maximum physical uplink shared channel (PUSCH) repetition value, and the DCI comprising a repetition number indication field;
determine a set of PUSCH repetition values corresponding to the maximum PUSCH repetition value;
select a first parameter from the determined set of PUSCH repetition values based on the repetition number indication field;
determine a total number of subframes required to transmit a PUSCH according to the first parameter, a total number of allocated resource units, and time occupied by each of the allocated resource units; and
transmit the PUSCH in N subframes, N being the determined total number of subframes, wherein:
the N is equal to the first parameter when an indication of sub-physical resource block (PRB) resource allocation is not received via one of the RRC signaling and the DCI,
the N is equal to a value calculated by multiplying a second parameter by a third parameter when the indication of sub-PRB resource allocation is received via one of the RRC signaling and the DCI,
the second parameter is a product of the total number of allocated resource units and a total number of uplink slots occupied by each of the allocated resource units divided by 2, and
the third parameter is a nearest integer equal to or larger than a quotient of the first parameter divided by the second parameter.

4. A base station, comprising:
a processor; and
a memory, the memory storing instructions, wherein
the instructions, when executed by the processor, cause the base station to:
transmit radio resource control (RRC) signaling and downlink control information (DCI) to a user equipment, the RRC signaling comprising a maximum physical uplink shared channel (PUSCH) repetition value, and the DCI comprising a repetition number indication field;
receive a PUSCH in N subframes from the user equipment, N being a total number of subframes, wherein:
a first parameter is selected, based on the repetition number indication field, from a set of PUSCH repetition values corresponding to the maximum PUSCH repetition value;
the N is determined according to the first parameter, a total number of allocated resource units, and time occupied by each of the allocated resource units,
the N is equal to the first parameter when the base station does not transmit an indication of sub-physical resource block (PRB) resource allocation via one of the RRC signaling and the DCI,
the N is equal to a value calculated by multiplying a second parameter by a third parameter when the base station transmits the indication of sub-PRB resource allocation via one of the RRC signaling and the DCI,
the second parameter is a product of the total number of allocated resource units and a total number of uplink slots occupied by each of the allocated resource units divided by 2, and
the third parameter is a nearest integer equal to or larger than a quotient of the first parameter divided by the second parameter.

* * * * *